(12) United States Patent
Chang et al.

(10) Patent No.: US 9,912,999 B2
(45) Date of Patent: Mar. 6, 2018

(54) SYSTEM FOR MANAGING MEDIA SERVICES

(71) Applicant: AT&T Intellectual Property I, LP, Atlanta, GA (US)

(72) Inventors: Hisao Chang, Cedar Park, TX (US); Richard Cox, New Providence, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/093,836

(22) Filed: Apr. 8, 2016

(65) Prior Publication Data
US 2016/0227293 A1    Aug. 4, 2016

Related U.S. Application Data

(63) Continuation of application No. 14/504,460, filed on Oct. 2, 2014, now Pat. No. 9,338,518, which is a (Continued)

(51) Int. Cl.
*H04N 21/6334*    (2011.01)
*H04N 7/16*    (2011.01)
(Continued)

(52) U.S. Cl.
CPC ......... *H04N 21/6334* (2013.01); *H04N 7/162* (2013.01); *H04N 21/25816* (2013.01); (Continued)

(58) Field of Classification Search
CPC ............. H04N 7/162; H04N 21/25816; H04N 21/4126; H04N 21/4316; H04N 21/43615; (Continued)

(56) References Cited

U.S. PATENT DOCUMENTS 8,060,624 B1    11/2011    McKinney et al.
8,204,073 B1 *    6/2012    Gailloux ............. H04M 1/7253
                                                    370/437
(Continued)

FOREIGN PATENT DOCUMENTS

JP    2005328394    11/2005
NZ    500203    2/2002
(Continued)

OTHER PUBLICATIONS

Sullivan, et al., Apparatus and Method for Communicating Media Between Communication Devices, 23 pages; U.S. Appl. No. 11/781,694 filed Jul. 23, 2007.
(Continued)

*Primary Examiner* — Chenea Smith
(74) *Attorney, Agent, or Firm* — Guntin & Gust, PLC; Jay H. Anderson (57) ABSTRACT

Aspects of the subject disclosure may include, for example, a device that includes a processor and a memory that stores executable instructions. The instructions, when executed by the processor, cause the processor to perform operations including detecting an indication that a first device that has established wireless communications with a second device by way a personal area network. The first device is authenticated based on the indication and according to a predetermined association between the first device and the second device. Information is provided to the second device to facilitate management of operations of the second device by the first device. Other embodiments are disclosed.

20 Claims, 4 Drawing Sheets

Related U.S. Application Data continuation of application No. 14/026,940, filed on Sep. 13, 2013, now Pat. No. 8,869,232, which is a continuation of application No. 11/866,873, filed on Oct. 3, 2007, now Pat. No. 8,555,330.

(51) Int. Cl.

| | | |
|---|---|---|
| *H04N 21/258* | (2011.01) | |
| *H04N 21/41* | (2011.01) | |
| *H04N 21/431* | (2011.01) | |
| *H04N 21/436* | (2011.01) | |
| *H04N 21/4363* | (2011.01) | |
| *H04N 21/61* | (2011.01) | |
| *H04N 21/45* | (2011.01) | |
| *H04N 21/4627* | (2011.01) | |

(52) U.S. Cl.
 CPC ..... *H04N 21/4126* (2013.01); *H04N 21/4316* (2013.01); *H04N 21/43615* (2013.01); *H04N 21/43637* (2013.01); *H04N 21/4508* (2013.01); *H04N 21/4627* (2013.01); *H04N 21/6175* (2013.01); *H04N 21/6181* (2013.01)

(58) Field of Classification Search
 CPC ........... H04N 21/6334; H04N 21/6181; H04N 21/4508; H04N 21/4627; H04N 21/6175; H04N 21/43637
 See application file for complete search history.

(56) References Cited

U.S. PATENT DOCUMENTS

| | | | | |
|---|---|---|---|---|
| 8,295,761 | B2* | 10/2012 | Zilliacus | H04N 5/44582 455/3.06 |
| 8,462,677 | B1* | 6/2013 | Gailloux | H04L 67/141 370/310 |
| 2002/0184635 | A1* | 12/2002 | Istvan | H04N 21/26283 725/51 |
| 2003/0002638 | A1 | 1/2003 | Kaars | |
| 2003/0073460 | A1* | 4/2003 | van Pelt | H04M 1/6066 455/556.1 |
| 2003/0110039 | A1 | 6/2003 | Brown et al. | |
| 2004/0147282 | A1 | 7/2004 | Nakasato et al. | |
| 2005/0120381 | A1 | 6/2005 | Yamaguchi | |
| 2006/0156352 | A1 | 7/2006 | Smith et al. | |
| 2006/0172700 | A1* | 8/2006 | Wu | G06F 21/35 455/41.2 |
| 2006/0270452 | A1 | 11/2006 | Gerzberg | |
| 2007/0124792 | A1 | 5/2007 | Bennett | |
| 2007/0180485 | A1* | 8/2007 | Dua | H04L 29/06027 725/114 |
| 2008/0108308 | A1 | 5/2008 | Ullah | |
| 2008/0148331 | A1 | 6/2008 | Walter | |
| 2008/0155619 | A1 | 6/2008 | Constantinof | |
| 2010/0017816 | A1* | 1/2010 | Martini | H04N 7/173 725/31 |

FOREIGN PATENT DOCUMENTS

| | | |
|---|---|---|
| WO | 0044168 A1 | 7/2000 |
| WO | 0167316 A1 | 9/2001 |

OTHER PUBLICATIONS

White, Scott, "System for Presenting Media Programs", U.S. Appl. No. 11/738,367 filed Apr. 20, 2-7, 23 pages.

* cited by examiner

SYSTEM FOR MANAGING MEDIA SERVICES

CROSS-REFERENCE TO RELATED APPLICATIONS

This application is a continuation of and claims priority to U.S. patent application Ser. No. 14/504,460 filed Oct. 2, 2014, which is a continuation of U.S. patent application Ser. No. 14/026,940 filed Sep. 13, 2013, now U.S. Pat. No. 8,869,232, which is a continuation of U.S. patent application Ser. No. 11/866,873 filed Oct. 3, 2007, now U.S. Pat. No. 8,555,330. All sections of the aforementioned applications are incorporated herein by reference in their entirety.

FIELD OF THE DISCLOSURE

The present disclosure relates generally to media services and more specifically to a system for managing media services.

BACKGROUND OF THE DISCLOSURE

Media content processors such as Set-Top Box (STB) receivers are typically managed by a radio frequency or infrared remote controller. Such controllers are generally shared by multiple parties in a household or office. Although some remote controllers can be customized, customization can be cumbersome on a per user basis.

DETAILED DESCRIPTION OF THE DRAWINGS

In one embodiment of the present disclosure, a computer-readable storage medium operating in a network element of a multimedia communication system can have computer instructions for receiving from a Set-Top Box (STB) receiver a Mobile Identification Number (MIN) of a cellular communication device that has established communications with the STB receiver by way of a Personal Area Network (PAN), determining whether the MIN of the cellular communication device has an association with the STB receiver, establishing communications with the cellular communication device by way of the STB receiver responsive to detecting an association between the MIN and the STB receiver, authenticating a subscriber of the STB receiver according to an authentication message supplied by the cellular communication device of said subscriber by way of the STB receiver, identifying a profile of the subscriber responsive to a successful authentication of the subscriber, transmitting to the STB receiver the profile of the subscriber to manage a presentation of media services by the STB receiver.

In one embodiment of the present disclosure, a Media Content Processor (MCP) can have a controller to detect a communication device roaming into a PAN, receive a communication identifier from the communication device, authenticate the communication device responsive to validating the communication identifier, and enable the communication device to manage operations of the MCP according to a profile of a subscriber of said communication device responsive to a successful authentication of said communication device.

In one embodiment of the present disclosure, a cellular phone can have a controller to detect a PAN managed by an MCP, establish communications with the MCP over the PAN, receive a notification from the MCP offering media content services upon receiving authentication data, transmit to the MCP a communication identifier, receive notice from the MCP that the cellular phone has been enabled to manage operations of the MCP responsive to the communication identifier having an association with the MCP, and manage operations of the MCP.

Figure 1:
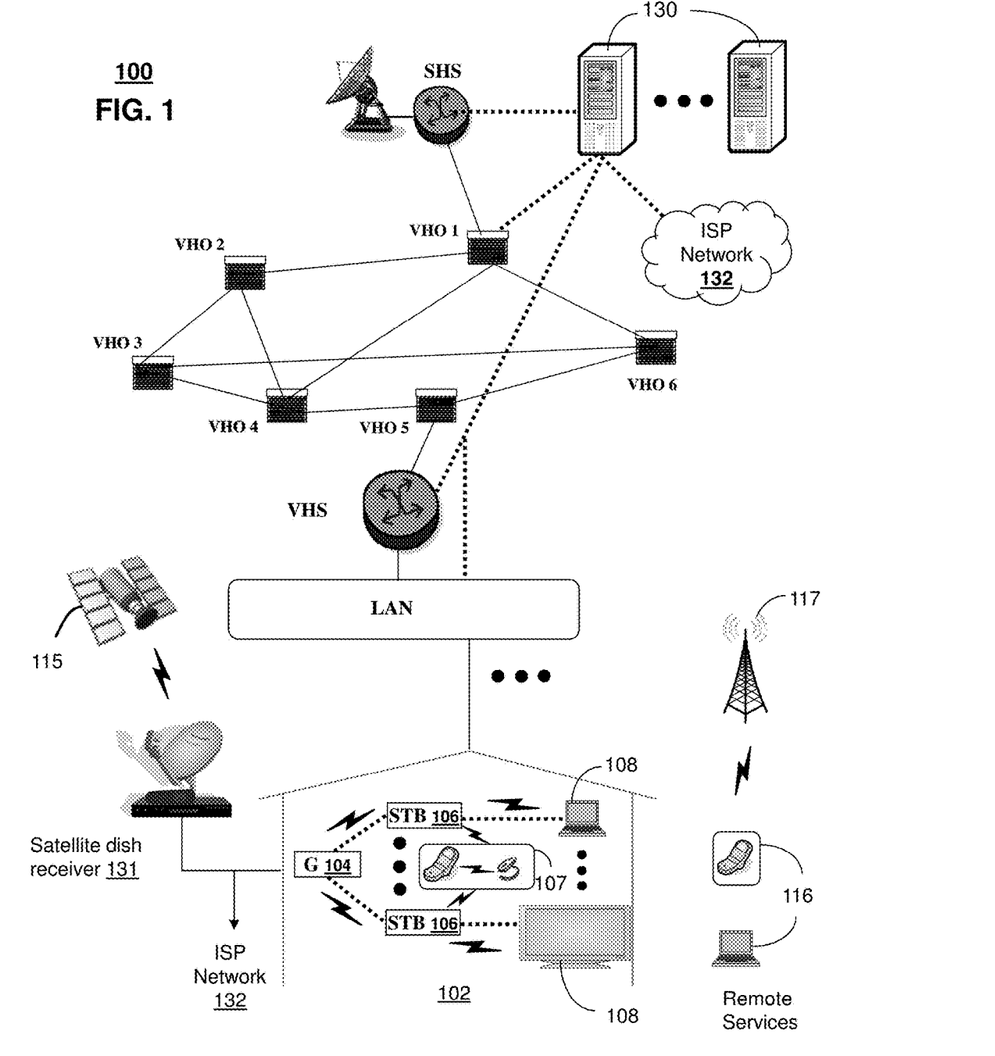
FIGS. 1-2 depict exemplary embodiments of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio only content, video only content, and/or combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media content processors 106 such as Set-Top Boxes (STBs) receivers which in turn present broadcast selections to media devices 108 such as computers or television units. Unicast traffic can also be exchanged between the STBs 106 and subsystems of the IPTV media system for services such as video-on-demand (VoD).

The STBs can be managed by a media controller 107. In the present illustration, the media controller 107 can represent a cellular phone comprising a wireless headset and wireless communication device. The wireless headset and wireless communication device can be wirelessly coupled to each other by way of a Personal Area Network (PAN). The STB receivers 106 can also include common communication technology to interact with the media controller 107 over the PAN. The PAN can operate according to any number of short-range wireless access protocols including without limitation 802 protocols defined by the Institute of Electrical and Electronics Engineers such as for example Bluetooth, Wireless Fidelity (or WiFi), and Zigbee. The PAN can also support other short range protocols such as ultra-wideband, and digital enhanced cordless telecommunications (or DECT).

It should be noted that the wireless communication device can operate as a multimode communication device. That is, it can communicate with the wireless headset and the STB receiver 106 over the PAN in one mode, and also communicate with a wireless cellular base station 117 according to any number of long-range wireless access technologies (e.g., GSM, CDMA, UMTS, etc.). Communications between the wireless communication device and the base station 117 can be over a voice and/or data channel (e.g., GPRS, EVDO, etc.)

The IPTV media system can be coupled to one or more computing devices 130 that can operate as a web server for providing portal services over an Internet Service Provider (ISP) network 132 to fixed media devices 108 or portable communication devices 116 by way of the wireless base station 117. The computing devices 130 can also represent a backend system that utilizes common computing technology for authenticating subscribers of the IPTV media system as well as managing profiles associated with said subscribers. The profile can represent a number of subscriber attributes such as for example subscriber media preferences established by each subscriber over the portal, a behavior model of the subscriber derived from common pattern analysis techniques applied to media content consumed by said subscriber, and so on. A subscriber profile can be used by the STB 106 to tailor media services on a per subscriber basis.

A satellite broadcast system can be used in place of the IPTV media system of FIG. 1. In this embodiment, signals transmitted by a satellite 115 can be intercepted by a satellite dish receiver 131 coupled to building 102 which conveys media signals to the media receivers 106. The media receivers 106 can be equipped with a broadband port to the ISP network 132. Although not shown, the communication system 100 can also be combined or replaced with analog or digital broadcast distributions systems such as cable TV systems. It would be apparent therefore to one of ordinary skill in the art that the present disclosure can be applied to any broadcast media system.

Figure 2:
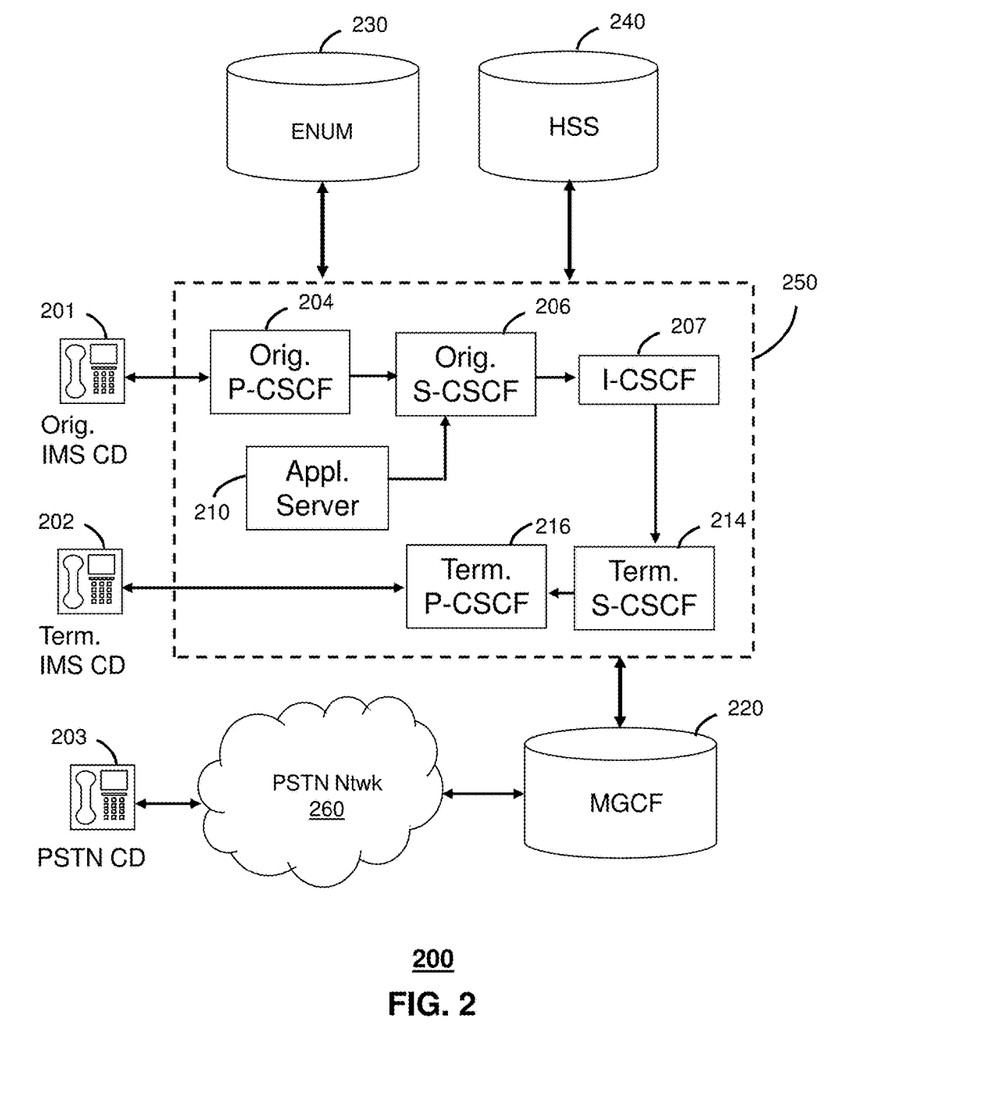

FIG. 2 depicts an exemplary embodiment of a communication system 200 employing an IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 or a Public Switched Telephone Network (PSTN) CD 203 using a Media Gateway Control Function (MGCF) 220 that connects the call through a common PSTN network 260. The CDs 201-203 can be representative embodiments of the wireless communication device of the media controller 107 and/or the fixed and portable communication devices 108, 116.

IMS CDs 201, 202 register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a Session Initiation Protocol (SIP) INVITE message to an originating P-CSCF 204 which communicates with a corresponding originating S-CSCF 206. The originating S-CSCF 206 can submit the SIP INVITE message to an application server (AS) such as reference 210 to provide a variety of services to IMS subscribers. For example, the application server 210 can be used to perform originating treatment functions on the calling party number received by the originating S-CSCF 206 in the SIP INVITE message.

Additionally, the originating S-CSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
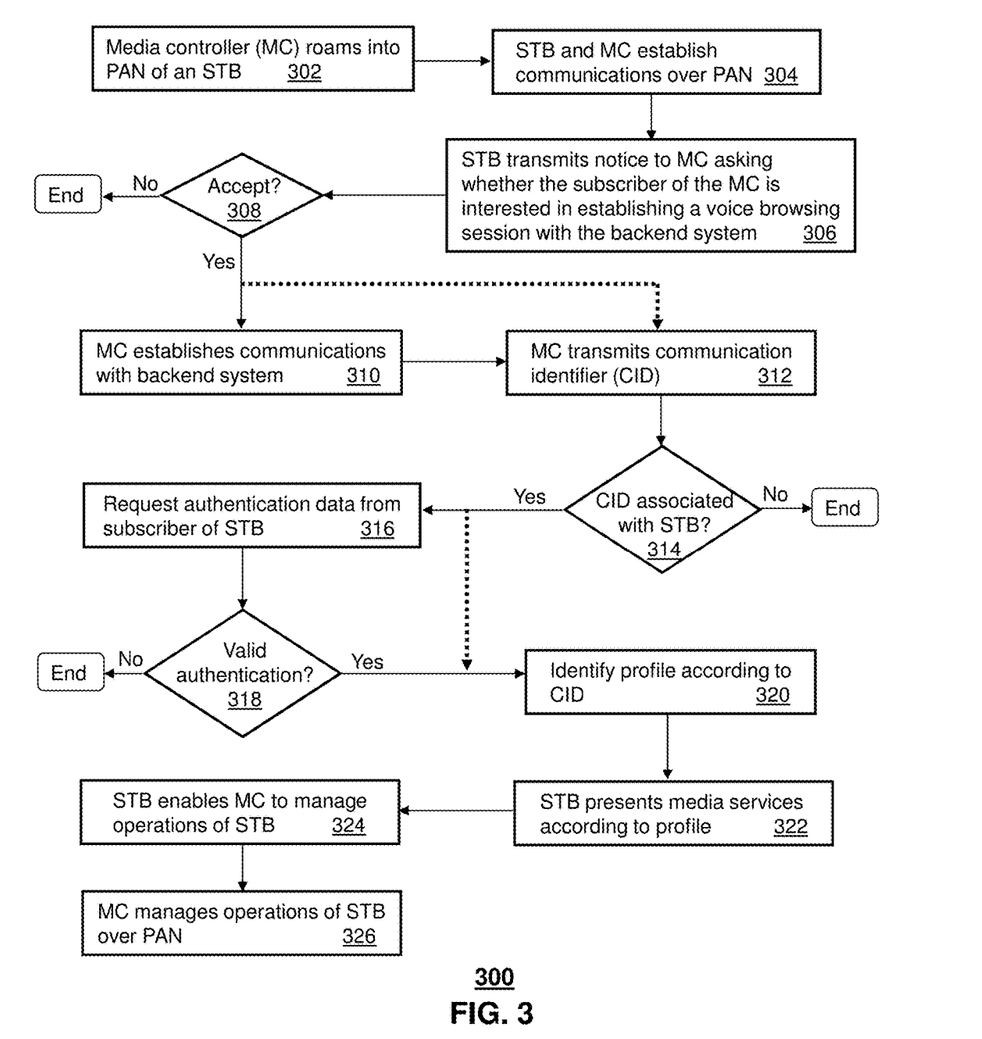
FIG. 3 depicts an exemplary method operating in portions of the communication system.

FIG. 3 depicts an exemplary method 300 operating in portions of the communication systems 100-200. For convenience, the term communication system 100 as used in the following paragraphs can mean communication systems 100 and 200 singly or in combination. Method 300 begins with step 302 in which the media controller 107 roams into the PAN of the STB 106. For illustration purposes only it will be assumed that the PAN is a Bluetooth PAN. With this in mind, the STB 106 and MC 107 establish in step 304 communications with each other over the Bluetooth PAN by common means. In step 306, the STB 106 can be programmed to transmit a notice to the MC 107 asking the subscriber of the MC whether s/he is interested in establishing a voice or data browsing session with a backend system 130 to enable the MC to manage operations of the STB.

The notice can be presented by way of a display of the wireless communication device of the MC 107. The subscriber of the MC 107 can respond to the notice by manipulating any number of user interface functions of the wireless communication device. For example, the subscriber can select a key of a keypad of the wireless communication, or the subscriber can speak into the wireless headset to dictate an action which is recognized by the wireless communication device by common voice recognition techniques. If the subscriber rejects the offer to establish communications with the backend system 130 in step 308, method 300 ends.

If on the other hand the subscriber accepts the offer, the MC 107 proceeds to step 310 where it establishes communications with the backend system 130 a number of ways. For example, the MC 107 can establish communications with the backend system 130 over a cellular communication session by way of the base station 117 using voice and/or data channels. Alternatively, the MC 107 can submit a request to the STB 106 over the Bluetooth PAN to establish communications with the backend system 130 over the ISP network 132. Once communications have been established between the MC 107 and the backend system 130, the MC proceeds to step 312 where it submits a communication identifier (CID) to the backend system.

The CID can represent a Mobile Identification Number (MIN) of the wireless communication device of the MC 107. In an IMS communication system, the CID or MIN can represent a SIP URI of the wireless communication device. In another embodiment, the CID or MIN can represent an E.164 number (e.g., 222-333-4444). In yet another embodiment, the CID or MIN can represent a Media Access Control (MAC) number, an Electronic Serial Number (ESN), an email address, or some other suitable means to identify the subscriber of the MC 107.

In step 314, the backend system 130 can be programmed to determine if the CID of the MC 107 is associated with the STB 106. This step can represent the backend system 130 indexing a database (local or remote) according to the CID to determine if the subscriber of the MC 107 is a potential subscriber of the STB 106 as well. The database used by the backend system 130 can be populated by a service agent of the communication system 100 when a consumer subscribes to the services of said communication system.

If there is no association between the CID and the STB 106, method 300 ends. Otherwise, the backend system 130 proceeds to step 316 where it submits a request to the MC 107 for authentication data. The request can be invoked by a voice browser of the backend system 130 operating as a common interactive voice response system (IVR) which can interact with the subscriber of the MC 107 during the authentication process. The authentication data can be provided by the subscriber of the MC 107 by voice (e.g., IVR: "Please state your password." Subscriber: "Dallas Cowboys") and/or keypad entry (e.g., IVR: "Please enter or state a personal identification number." Subscriber: states a PIN or selects keys on keypad which generate DTMF tones). The authentication data can represent a password known only to the subscriber which a service provider of the communication system 100 can require to avoid misuse of the media services by unsubscribed users.

If the backend system 130 detects in step 318 that the authentication data supplied by the subscriber is invalid, method 300 can end after a prescribed number of attempts have failed (e.g., not more than three tries). If the authentication data is valid, the backend system 130 can proceed to step 320 where it identifies a profile of the subscriber according to the CID. The profile as noted earlier can be used to tailor media services presented by the STB 106 to the preferences of the subscriber. In step 322, the backend system 130 can transmit the profile to the STB 106 over the ISP network 132 and direct it to present media services according to said profile.

Responsive to receiving the profile, the STB 106 can enable in step 324 the MC 107 to manage its operations. The STB 106 can enable the MC 107 to manage the STB's operations by submitting a notice to the MC which the MC presents to the subscriber audibly at the wireless headset or visually by way of a display of the wireless communication device. From this point on, the subscriber can manage in step 326 operations of the STB 106 by way of the MC 107.

In step 326 the subscriber can perform a number of functions from the MC 107. For example the subscriber can switch between voice or audio media channels of the STB 106. The subscriber can also browse a VoD catalog of the communication system 100. The subscriber can also manage DVR services of the STB 106. The subscriber can also download to the STB 106 media files stored in the MC 107 to a personal library maintained by the STB.

Any of these activities can be managed by voice or keypad responses applied to the MC 107 by the subscriber. The interactions between the MC 107 and the STB 106 can occur in a number of ways. For example, the wireless headset of the MC 107 can directly connect to the STB 106. The wireless headset can instead connect to the wireless communication device by way of the Bluetooth PAN, and the wireless communication device can connect to the STB 106 by way of the Bluetooth PAN. In yet another embodiment the subscriber can exclusively use the wireless communication device (without the wireless headset) to manage operations of the STB 106. In this embodiment, the wireless communication device can as before interface to the STB 106 by way of the Bluetooth PAN.

Method 300 provides a means for multiple subscribers of the STB 106 to uniquely manage media services of the STB by way of their respective media controller 107 (i.e., cellular phone, PDA, laptop computer, or similar communication device). This is especially useful in a multi-user household or office environment.

Upon reviewing the aforementioned embodiments, it would be evident to an artisan with ordinary skill in the art that said embodiments can be modified, reduced, or enhanced without departing from the scope and spirit of the claims described below. For example, method 300 can be adapted so that the functions of the backend system 130 are performed in whole or in part by the STB 106. Accordingly the STB 106 can manage the subscriber's profile. The STB 106 can also perform the association and authentication steps described for the backend system 130. Method 300 can also be adapted to skip the authentication steps 316 and 318 of FIG. 3.

In yet another embodiment, method 300 can also be adapted so that the media controller 107 (embodied for example in a cell phone) transmits the profile of the subscriber to the STB 106 to manage presentations thereby. For example, suppose a user is watching a TV program on his/her cell phone. When the cell phone enters the PAN, it performs in whole or in part steps 302 through 318 and transmits a profile of the subscriber to the STB 106. The profile can provide real-time information associated with activities taking place at the cell phone as well as predefined preferences of the subscriber. The profile can thus inform the STB 106 that the subscriber is presently viewing a select TV program. The STB 106 can in response immediately search the TV program and begin its presentation at media device 108 once found; thus providing the subscriber a seamless transition between media devices (i.e., viewing the TV program on the cell phone display versus viewing the same program on a large screen TV).

In another embodiment, method 300 can be adapted so that the subscriber is controlling functions of the STB 106 by way of the wireless headset (e.g., Bluetooth headset connected to STB over the PAN) while surfing the Internet or engaging in a chat room or instant messaging (IM) session on the cell phone over WiFi or a cellular data channel (e.g., GPRS, CDMA-1×, EVDO, etc.). In this embodiment, the subscriber can for example receive a message from a friend over an IM session suggesting a new program to watch. The subscriber can communicate this new program to the STB 106 over a speech command ("Please switch to channel 35"). Thus the wireless headset and cell phone can perform multiple communications over disparate communication paths in a multimodal fashion. That is, the subscriber can communicate with the STB 106 in a voice modality with the wireless headset while also communicating with a third party over a data channel supplied by the cell phone independent of the STB in a visual and/or touch-sensitive modality.

These are but a few examples of modifications that can be applied to the present disclosure without departing from the scope of the claims. Accordingly, the reader is directed to the claims section for a fuller understanding of the breadth and scope of the present disclosure.

Figure 4:
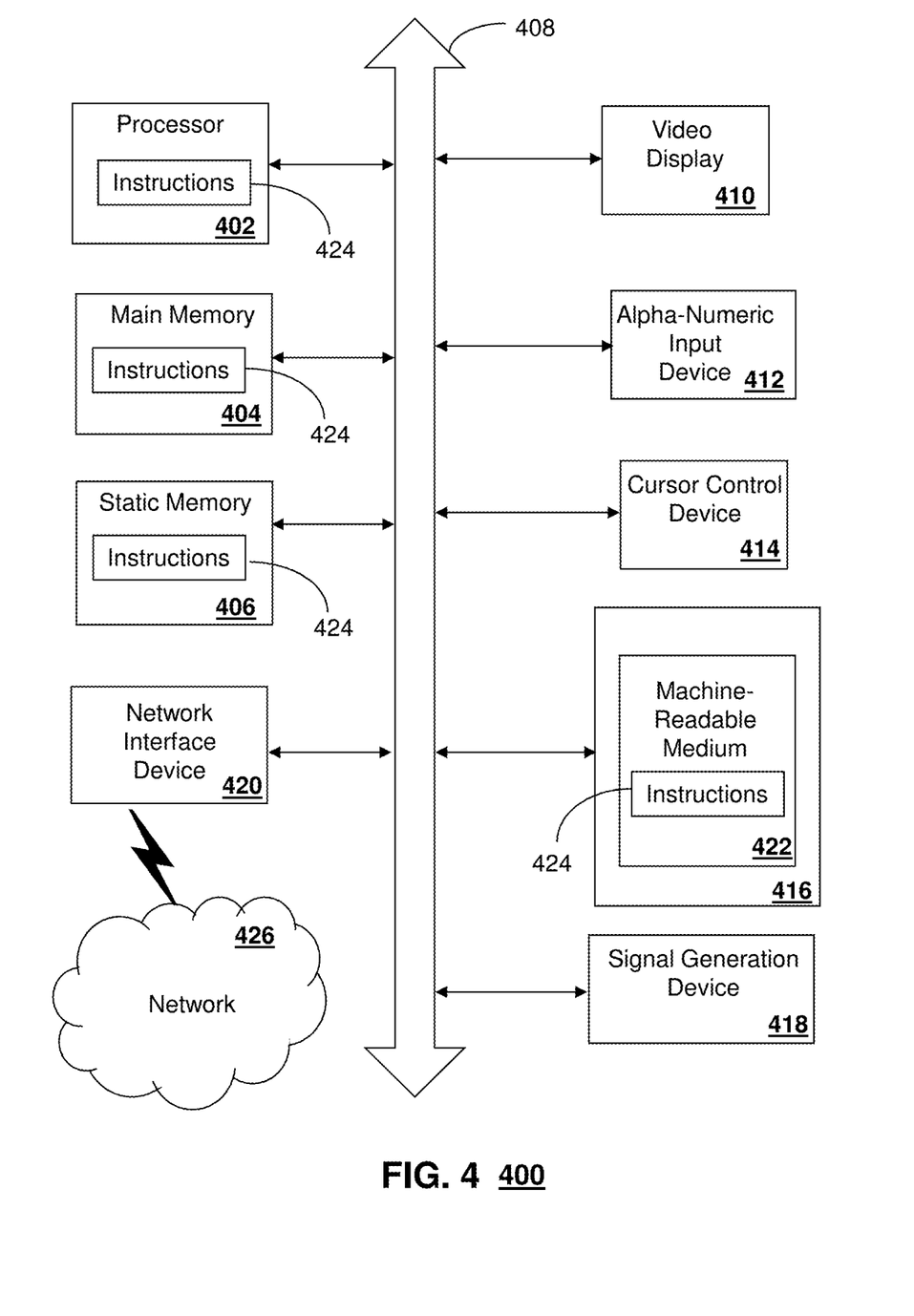
FIG. 4 is a diagrammatic representation of a machine in the form of a computer system within which a set of instructions, when executed, may cause the machine to perform any one or more of the methodologies discussed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a mass storage medium 416, a signal generation device 418 (e.g., a speaker or remote control) and a network interface device 420.

The mass storage medium 416 may include a computer-readable storage medium 422 on which is stored one or more sets of instructions (e.g., software 424) embodying any one or more of the methodologies or functions described herein, including those methods illustrated above. The computer-readable storage medium 422 can be an electromechanical medium such as a common disk drive, or a mass storage medium with no moving parts such as Flash or like non-volatile memories. The instructions 424 may also reside, completely or at least partially, within the main memory 404, the static memory 406, and/or within the processor 402 during execution thereof by the computer system 400. The main memory 404 and the processor 402 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the computer-readable storage medium 422 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system facilitate performance of operations comprising:
facilitating network communications between a mobile device and a backend system in response to acceptance of an offer to establish communications between the mobile device and a media processor, wherein the backend system is remote from the media processor, wherein the offer is exchanged wirelessly between the mobile device and the media processor by way of a personal area network, wherein the network communications between the mobile device and the backend system comprise a browsing session whereby the mobile device is enabled to manage operations of the media processor, wherein the network communications are separate from the personal area network;
authenticating the mobile device, responsive to the acceptance of the offer and according to a predetermined association between the mobile device and the media processor stored in the backend system, wherein the authenticating comprises submission of an identifier for the mobile device from the mobile device directly to the backend system via the network communications; and
providing information to the media processor to facilitate management by the mobile device of the operations of the media processor.

2. The device of claim 1, wherein the management of the operations of the media processor comprises management of digital video recorder services, and wherein the facilitating of the network communications between the mobile device and the backend system comprises one of establishing a cellular communication session by way of a base station or submitting a request to the media processor over a personal area network to establish communications between the mobile device and the backend system over an Internet service provider network.

3. The device of claim 1, wherein the operations further comprise responsive to the authenticating of the mobile device, submitting a notice to the mobile device that the mobile device has been authorized to manage the operations of the media processor, wherein the notice is provided to a user by way of one of an audible notice at a wireless headset, a visual notice by way of a display of the mobile device or a combination thereof.

4. The device of claim 1, wherein the information to facilitate management of operations of the media processor comprises a media catalog accessible by the mobile device to facilitate management of media services of the media processor.

5. The device of claim 1, wherein the personal area network operates according to a protocol selected from a group consisting of a Bluetooth protocol, a wireless fidelity protocol, an ultra-wideband protocol, a Zigbee protocol, an 802 wireless access protocol define by the Institute of Electrical and Electronics Engineers, and a digital enhanced cordless telecommunications protocol.

6. The device of claim 1, wherein the operations of the media processor comprises management of media services provided to the media processor by way of a multimedia communication system selected from a group consisting of an interactive television communication system, a satellite television communication system, and a cable television communication system, and wherein the media processor utilizes a profile of a user to tailor a presentation of media content for the user.

7. The device of claim 1, wherein the operations further comprise notifying the media processor that a user has been authenticated, wherein the media processor facilitates management of operations of the media processor by the mobile device as a remote controller responsive to the notifying, and wherein the exchange of the offer comprises an exchange of communications with an interactive voice response system.

8. A non-transitory machine-readable storage medium comprising executable instructions that, when executed by a processing system including a processor, facilitate performance of operations, comprising:
facilitating extension of an offer to a mobile device to access operations of a media processing device responsive to the mobile device roaming into a personal area network of the media processing device, wherein the offer is exchanged wirelessly between the mobile device and the media processing device by way of a personal area network;
determining an identifier of the mobile device, wherein the identifier is provided directly to a backend system by way of network communications between the mobile device and the backend system responsive to an acceptance of the offer, allowing the backend system to authorize the mobile device to obtain an authorization according to a predetermined association between the mobile device and the media processing device, wherein the backend system is remote from the media processing device, wherein the network communications between the mobile device and the backend system comprise a browsing session whereby the mobile device is enabled to manage operations of the media processing device;
determining that the mobile device is authorized to access the operations of the media processing device based on the authorization; and
facilitating management of the operations of the media processing device by the mobile device responsive to the determining that the mobile device is authorized to access the operations of the media processing device.

9. The non-transitory machine-readable storage medium of claim 8, wherein the identifier comprises a communication identifier, and wherein the operations further comprise:
facilitating communications with a network element of a multimedia communication system; and
providing the communication identifier to the network element to authenticate the mobile device.

10. The non-transitory machine-readable storage medium of claim 8, wherein the operations further comprise retrieving a profile according to the identifier.

11. The non-transitory machine-readable storage medium of claim 8, wherein the mobile device comprises a communication device, and wherein the identifier comprises a mobile identification number of the mobile device.

12. The non-transitory machine-readable storage medium of claim 8, wherein the operations further comprise:
receiving an authentication message; and
authenticating a subscriber of media services according to the authentication message, wherein the media services are accessible by way of the media processing device.

13. The non-transitory machine-readable storage medium of claim 8, wherein the mobile device comprises a headset wirelessly coupled to the media processing device by way of the personal area network.

14. The non-transitory machine-readable storage medium of claim 8, wherein the personal area network operates according to one of a Bluetooth protocol, a wireless fidelity protocol, an ultra-wideband protocol, a Zigbee protocol, a digital enhanced cordless telecommunications protocol, or combinations thereof.

15. The non-transitory machine-readable storage medium of claim 8, wherein the media processing device comprises a media content processor operating in one of an interactive television communication system, a satellite television communication system, or a cable television communication system, and wherein the processor is adapted to present media content.

16. A device, comprising:
a processing system including a processor; and
a memory that stores executable instructions that, when executed by the processing system, facilitate performance of operations comprising:
facilitating communications between a media processing device and a backend system in response to acceptance of an offer to establish communications between a first device and the media processing device by way of a wireless local area network, wherein the backend system is remote from the media processing device;
identifying a first notification that an offer has been extended to the first device by way of the wireless local area network to access operations of the media processing device; and
identifying a second notification that access to management of the operations of the media processing device have been provided to the first device, wherein the first device is enabled to manage the operations of the media processing device in a browsing session between the first device and the backend system, wherein the access to management of the operations of the media processing device has been authorized according to a predetermined association between the first device and the media processing device responsive to a submission of an identifier for the first device from the first device to the backend system.

17. The device of claim 16, wherein the operations further comprise accessing media content, wherein one of the first device or a network element of a multimedia communication system from which the media processing device operates, associates a communication identifier with the media processing device, and directs the media processing device to present media content to equipment of a subscriber responsive to the communication being recognized by way of the communication identifier.

18. The device of claim 17, wherein the accessing of the media content comprises accessing recorded media content by way of a digital video recorder.

19. The device of claim 16, wherein the media processing device comprises a media content processor, wherein the management of the operations of the media processing device comprise management of media services, wherein the wireless local area network operates according to one of a group consisting of a Bluetooth protocol, a wireless fidelity protocol, an ultra-wideband protocol, a Zigbee protocol, and a digital enhanced cordless telecommunications protocol, and wherein the media content processor corresponds to a set-top box receiver operating in a system selected from a group consisting of an interactive television communication system, a satellite television communication system, and a cable television communication system.

20. The device of claim 16, wherein the operations further comprise transmitting to the media processing device a profile of a subscriber of services by way of the first device to facilitate management of operations of the media processing device, comprising management of media services.

* * * * *